(12) United States Patent
Zavesky et al.

(10) Patent No.: US 12,335,660 B2
(45) Date of Patent: Jun. 17, 2025

(54) FACILITATING AVATAR MODIFICATIONS FOR LEARNING AND OTHER VIDEOTELEPHONY SESSIONS IN ADVANCED NETWORKS

(71) Applicants: AT&T Intellectual Property I, L.P., Atlanta, GA (US); AT&T Mobility II LLC, Atlanta, GA (US)

(72) Inventors: Eric Zavesky, Austin, TX (US); Jing Sasha Guo, Olney, MD (US); Eric Petajan, Watchung, NJ (US); Jessica R Owensby, Alpharetta, GA (US); James Pratt, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 182 days.

(21) Appl. No.: 17/811,092

(22) Filed: Jul. 7, 2022

(65) Prior Publication Data
US 2024/0015262 A1   Jan. 11, 2024

(51) Int. Cl.
*H04N 7/15* (2006.01)
*G09B 5/06* (2006.01)
(52) U.S. Cl.
CPC .............. *H04N 7/157* (2013.01); *G09B 5/06* (2013.01)
(58) Field of Classification Search
CPC .................... H04N 7/157; G09B 5/06
USPC ...................................... 348/14.08
See application file for complete search history.

(56) References Cited

U.S. PATENT DOCUMENTS

| | | | |
|---|---|---|---|
| 10,354,256 B1* | 7/2019 | McInerny | G06T 13/40 |
| 2002/0101505 A1* | 8/2002 | Gutta | H04N 7/15 |
| | | | 348/E7.083 |
| 2010/0073458 A1* | 3/2010 | Pace | H04N 21/4532 |
| | | | 348/E7.083 |
| 2011/0112665 A1* | 5/2011 | Roberts | G06F 3/0482 |
| | | | 715/753 |
| 2015/0058023 A1* | 2/2015 | Goo | G10L 15/005 |
| | | | 704/277 |
| 2018/0336716 A1* | 11/2018 | Ramprashad | H04L 51/10 |
| 2020/0314483 A1* | 10/2020 | Rakshit | H04N 21/4318 |
| 2022/0156998 A1* | 5/2022 | Lee | G06N 20/00 |
| 2023/0222721 A1* | 7/2023 | Chen | G06T 13/40 |
| | | | 345/419 |
| 2023/0402191 A1* | 12/2023 | Ballagas | G16H 15/00 |

OTHER PUBLICATIONS

Lunden "Microsoft acquires TakeLessons, an online and in-person tutoring platform, to ramp up its edtech play" TechCrunch, Sep. 10, 2021 (4 pages).

* cited by examiner

*Primary Examiner* — Binh Kien Tieu

(57) ABSTRACT

Facilitating avatar modifications for learning and other videotelephony sessions in advanced networks is provided herein. Operations of a system include evaluating a recorded interaction associated with a first entity during consumption of a first portion of a video conference determined to include the first entity. The operations also can include transforming an actual representation of the first entity in the recorded interaction to an avatar representation, resulting in an edited interaction of the first entity. Further, the operations can include outputting the edited interaction of the first entity for consumption of a second portion of the video conference by rendering the edited interaction for a second entity.

19 Claims, 14 Drawing Sheets

FACILITATING AVATAR MODIFICATIONS FOR LEARNING AND OTHER VIDEOTELEPHONY SESSIONS IN ADVANCED NETWORKS

TECHNICAL FIELD

This disclosure relates generally to the field of videotelephony and, more specifically, to altering one or more avatars in an interactive videotelephony session.

BACKGROUND

Remote content delivery is increasingly prevalent with the proliferation of online learning (e.g., distance learning) and virtual classrooms. For example, virtual classrooms permit live and/or pre-recorded teaching to continue, for instance, when in-person learning is not possible or is not practical. As compared to in-person learning, there exist drawbacks during remote learning since online learning is limited to a single window interaction and, therefore, focus of a viewer's attention might not be drawn to the object of interest and, thus, the viewer might not be able to follow along and fall behind. It can be difficult for a remote instructor to recognize these problems if a live remote instructor even exists at all. Accordingly, unique challenges exist as it relates to videotelephony.

BRIEF DESCRIPTION OF THE DRAWINGS

Various non-limiting embodiments are further described with reference to the accompanying drawings in which.

DETAILED DESCRIPTION

Figure 1:
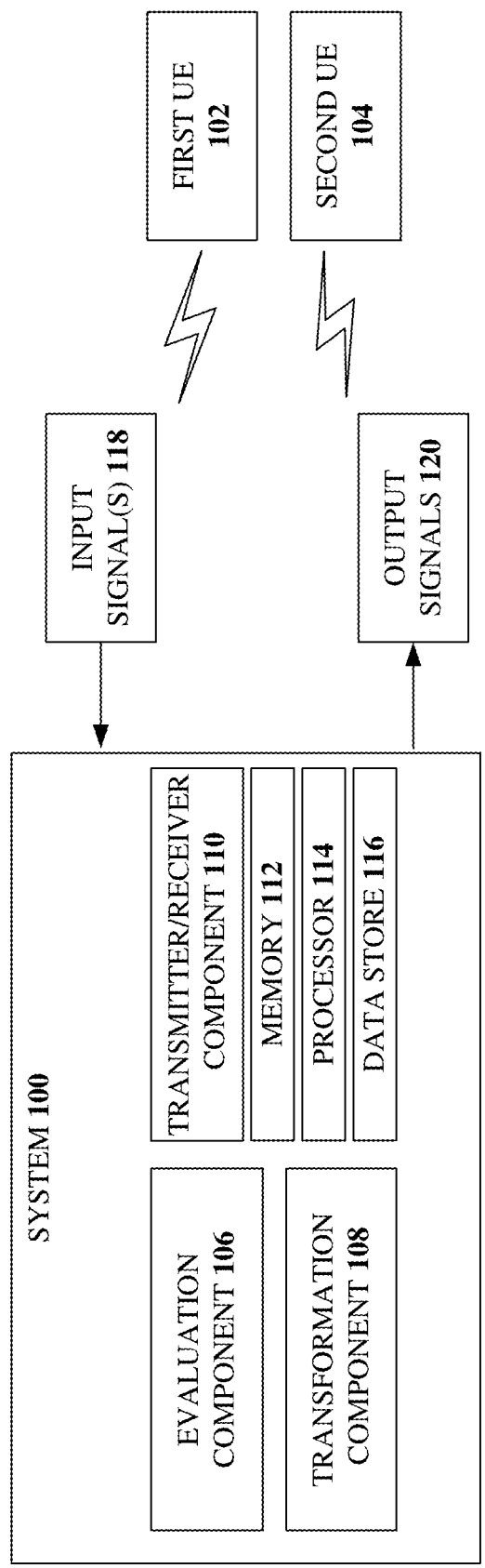
FIG. 1 illustrates an example, non-limiting, system that facilitates avatar modifications in a videotelephony environment in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Various devices, also referred to as user equipment (UE), are used in a learning environment or in another type of environment (e.g., virtual meetings or other types of communications) among two or more users. In some situations, a full body representation or interactions of the users are not needed in the learning (or other) environment. Traditionally, a determination of whether a full body representation and/or interaction is needed is a manual determination and needs manual manipulation of the virtual environment, if such manipulation can be performed at all.

Content delivery (e.g., for remote learning or for other types of environments) can be improved in various ways, and various embodiments are described herein that facilitate these improvements. Advantages of the disclosed embodiments include, but are not limited to, assisting users by providing a better learning experience with customized setup, as compared to traditional learning environments. The disclosed embodiments also protect privacy, can mitigate complaints (e.g., legal actions), and can save money by transmitting on relevant (and user opt-in) portions of the immersion to others. Further, the users can experience different social treatment based on different avatar images. Potentially, this can help society to develop and practice empathy. The various embodiments provided herein can propose alternate views based on sentiment response, for example. In addition, learner frustrations and interactions are fully captured and annotated in the instructor's material so that the instructor can return to the experience to learn when and/or where people need more help.

According to an embodiment, a method can include evaluating, by a system comprising a processor, an interaction of an entity during consumption of first streaming content by the entity, resulting in an evaluated interaction. The method also can include, based on the evaluated interaction, replacing, by the system, a portion of the entity in the evaluated interaction with information indicative of an avatar representation of the entity, resulting in second streaming content. The first streaming content and the second streaming content can be respective portions of a video conference.

In an example, the avatar representation is a first avatar representation, the first streaming content is able to be represented according to a first modality and a second modality, and replacing the portion of the entity includes using the first avatar representation based on the first streaming content being able to be represented according to the first modality. Further, replacing the portion of the entity includes using a second avatar representation based on the first streaming content being able to be represented according to the second modality.

Further to the above example, the first modality is related to audio content and the second modality is related to visual content. Alternatively or additionally, using of the first avatar representation includes selecting the first avatar representation from a first group of avatar representations mapped to the first modality. Further, using of the second avatar representation includes selecting the second avatar representation from a second group of avatar representations that is mapped to the second modality.

According to some implementations, the entity is a first entity and the method includes facilitating, by the system, a transmission of the second streaming content to a second entity. In these implementations, the first entity and the second entity are determined to be participating in a video conference.

According to an example, the replacing includes masking an identity of the entity. In another example, the replacing includes mitigating an amount of bandwidth consumed during transmission and consumption of the second streaming content as compared to a video recording of the entity. In yet another example, the replacing includes inferring a state of the entity based on employing natural language processing.

Another embodiment relates to a system that includes a processor and a memory that stores executable instructions that, when executed by the processor, facilitate performance of operations. The operations can include evaluating a recorded interaction associated with a first entity during consumption of a first portion of a video conference determined to include the first entity. The operations also can include transforming an actual representation of the first entity in the recorded interaction to an avatar representation, resulting in an edited interaction of the first entity. Further, the operations can include outputting the edited interaction of the first entity for consumption of a second portion of the video conference by rendering the edited interaction for a second entity. The transforming can include conveying an emotional state of the first entity based on a selection of the avatar representation, according to some implementations.

According to an implementation, the recorded interaction is a first recorded interaction, the avatar representation is a first avatar representation, the edited interaction is a first edited interaction, and the operations further include evaluating a second recorded interaction associated with the first entity during consumption of a third portion of the video conference determined to include the first entity. The operations can also include changing from the first avatar representation to a second avatar representation based on the evaluating of the second recorded interaction, resulting in a second edited interaction of the first entity.

In some implementations, the operations can include outputting the second edited interaction of the first entity for consumption of a fourth portion of the video conference by rendering the second edited interaction for the second entity. In alternative or additional implementations, the operations can include concealing, via the avatar representation, an identity of the first entity from the second entity while rendering the edited interaction for the second entity.

Additionally or alternatively, the operations can include determining that a first language spoken by the first entity and a second language spoken by the second entity are different languages. Further, the operations can include converting the first language into the second language for consumption by the second entity, resulting in a converted audio content. The edited interaction includes the converted audio content.

In some implementations, the operations can include augmenting voice content of the first entity. The augmenting can include masking an identity of the first entity while rendering the edited interaction for the second entity.

In accordance with some implementations, the avatar representation is a first avatar representation, and the operations include determining that a context of the video conference has changed from a first context to a second context, wherein the first context is based on visual information. The second context is based on audible information. The operations also include modifying an ongoing edited interaction based on changing the first avatar representation associated with the first context to a second avatar representation associated with the second context.

A further embodiment relates to a non-transitory machine-readable medium, comprising executable instructions that, when executed by a processor of a first device, facilitate performance of operations. The operations can include monitoring first facial expressions of a first user and second facial expressions of a second user. The first user and the second user are engaged in an interactive videotelephony session via network equipment that is part of a communication network. Further a first user equipment is associated with the first user and a second user equipment is associated with the second user. The operations can also include, based on the first facial expressions of the first user, transforming a first visual representation of the first user into a first avatar representation. Further, the operations can include, based on the second facial expressions of the second user, transforming a second visual representation of the second user into a second avatar representation. The first avatar representation and the second avatar representation are respectively rendered via the first user equipment of the first user and the second user equipment of the second user.

According to some implementations, the operations can include determining a learning mode associated with the interactive videotelephony session and changing a feature of the second avatar representation based on the learning mode. In alternative or additional implementations, the operations can include facilitating a first rendering of the first avatar representation on a first display of the second user equipment and facilitating a second rendering of the second avatar representation on a second display of the first user equipment.

In further detail, FIG. 1 illustrates an example, non-limiting, system 100 that facilitates avatar modifications in a videotelephony environment in accordance with one or more embodiments described herein. The system 100, as well as other embodiments discussed herein can be configured to operate in various communication protocols including, but not limited to, a network communication protocol, a 6G network communication protocol, a new radio (NR) network communication protocol, other advanced communication protocols and/or legacy communication protocols (e.g., a Long Term Evolution (LTE) network communication protocol, a 3G network communication protocol, a 4G network communication protocol, and so on).

Aspects of systems (e.g., the system 100 and the like), equipment, UEs, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

The system 100 can be configured to facilitate interactions and understanding between various entities or participants engaging in a videotelephony session. As utilized herein an entity can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

For example, as illustrated, the system 100 can facilitate interaction between various user equipment (UE), illustrated as a first UE 102 and a second UE 104. Although two UEs are illustrated and described for purposes of simplicity, the disclosed embodiments are not limited to this implementation. Instead, interactions between more than two entities, via their respective UEs can be performed as discussed herein. Further, in some implementations, an interaction between the system 100 and a single entity via a single UE can be performed (e.g., based on one or more recorded interactions). Although discussed with respect to a one-to-one relationship, the disclosed aspects are not so limited and can be also applied to a one-to-many relationship and/or a many-to-many relationship.

As discussed herein, the disclosed aspects can be employed in a learning environment (e.g., a virtual classroom) or another environment of a videotelephony session (e.g., conference call, video conference, video session, and so on). In a specific example as it relates to a learning environment, virtual learning might not be effective or enticing to learners for various reasons. For example, the learning experience might be monotonous, which causes a learner to lose focus and become bored. The inability of the instructor to understand the learner's intent and progress due to limitations of the virtual environment can render the learning environment ineffective. Further, inability of the instructor to adapt to the learner's progress, sentiment, and/or intent due to limitations of the virtual environment can limit the ability of the instructor to react effectively to objectives of tasks at hand. Additionally, the current learner image in the window (e.g., the display screen, the capture range of a camera) often does not protect humans for privacy reasons. For example, while someone else outside the learning party is speaking in the background, the speaker's image and/or voice will be captured in the learner's window (e.g., captured by one or more cameras and/or microphones of the learner's equipment), and rendered on UEs of other entities that are participating in that learning environment.

As illustrated in FIG. 1, the system 100 can be integrated as a standalone system. Alternatively or additionally, the system 100 can be included, at least in part, in network equipment, user equipment, or other equipment. For example, although illustrated separately from the first UE 102 and the second UE 104, each UE can include one or more functionalities of the system 100. For example, the first UE 102 can include one or more functionalities (or all functionalities) of the system 100, the second UE 104 can include one or more functionalities (or all functionalities) of the system 100, and/or subsequent UEs can include one or more functionalities (or all functionalities) of the system 100.

In various embodiments, the system 100, the first UE 102, the second UE 104, other equipment, and so on, can be any type of component, machine, device, facility, apparatus, and/or instrument that includes a processor and/or can be capable of effective and/or operative communication with a wired and/or wireless network. Components, machines, apparatuses, devices, facilities, and/or instrumentalities that can include the system 100, the first UE 102, the second UE 104, other equipment, other UEs, and so on, can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like. Further, according to some implementations, the first UE 102, the second UE 104, other equipment, other UEs, and so on can be classified as Internet of Things (IoT) devices, as Internet of Everything (IoE) devices, electric vehicles (including unmanned vehicles, which can be unmanned aerial vehicles), or the like.

The system 100 can include an evaluation component 106, a transformation component 108, a transmitter/receiver component 110, at least one memory 112, at least one processor 114, and at least one data store 116. In various embodiments, one or more of: the evaluation component 106, the transformation component 108, the transmitter/receiver component 110, the at least one memory 112, the at least one processor 114, and the at least one data store 116, and/or other system components discussed herein can be electrically and/or communicatively coupled to one another to perform one or more of the functions of the system. In some embodiments, one or more of: the evaluation component 106, the transformation component 108, the transmitter/receiver component 110, and/or other system components discussed herein can include software instructions stored on the at least one memory 112 and/or the at least one data store 116 and executed by the at least one processor 114. The system 100 can also interact with other hardware and/or software components not depicted in FIG. 1.

The system 100 can receive (e.g., via the transmitter/receiver component 110) one or more input signals 118 that include at least information indicative of an interaction of an entity associated with the first UE 102 during consumption of a first streaming content (e.g., a first portion of a video conference) by the entity. Based on the one or more input signals 118, the information indicative of an interaction can be retained in the at least one memory 112 and/or the at least one data store 116. Alternatively or additionally, the information indicative of the interaction can be retained in another storage media, which can be external to the system 100.

The evaluation component 106 can evaluate the recorded interaction (e.g., voice, gestures, facial expressions, movements, and so on) by the first entity associated with the first UE 102. Based on the evaluation, the transformation component 108 can transform an actual representation of the first entity in the recorded interaction to an avatar representation, resulting in an edited interaction of the first entity. The edited interaction of the first entity can be output via the transmitter/receiver component 110 for consumption of a second portion of the video conference by rendering the edited interaction for a second entity. For example, the edited information can be output at the second UE 104. The output can be via one or more displays and/or one or more microphones of the second UE 104.

It is noted that although the various embodiments discuss processing information and/or avatars associated with a first entity separately from a similar processing of information and/or avatars associated with a second entity and/or subsequent entities, the disclosed embodiments are not so limited. Instead, respective processing of information and/or avatars, and outputting related information for the first entity, the second entity, and/or the subsequent entities can occur at a same time or substantially the same time.

The at least one memory 112 can be operatively connected to the at least one processor 114. The at least one memory 112 and/or the at least one data store 116 can store executable instructions that, when executed by the at least one processor 114 can facilitate performance of operations. Further, at least one processor 114 can be utilized to execute computer executable components stored in the at least one memory 112 and/or the at least one data store 116.

For example, the at least one memory 112 can store protocols associated with facilitating avatar modifications for learning in advanced networks as discussed herein. Further, the at least one memory 112 can facilitate action to control communication between the system 100, other systems, equipment, network equipment, and/or user equipment such that the system 100 can employ stored protocols and/or processes to facilitate avatar modifications as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 114 can facilitate avatar modifications as discussed herein. The at least one processor 114 can be a processor dedicated to analyzing and/or generating information received, a processor that controls one or more components of the system 100, and/or a processor that both analyzes and generates information received and controls one or more components of the system 100.

According to an embodiment, the system 100 (as well as other systems and other embodiments discussed herein) can facilitate an improved learning experience or other video-telephony experiences with customized set up as compared to traditional systems. User privacy can be protected and/or a user can experience different social treatment based on different avatar representations. Additionally, alternative views can be provided based on sentiment response. In addition, viewer frustrations and interactions can be fully captured and annotated to facilitate a better learning experience.

Figure 2:
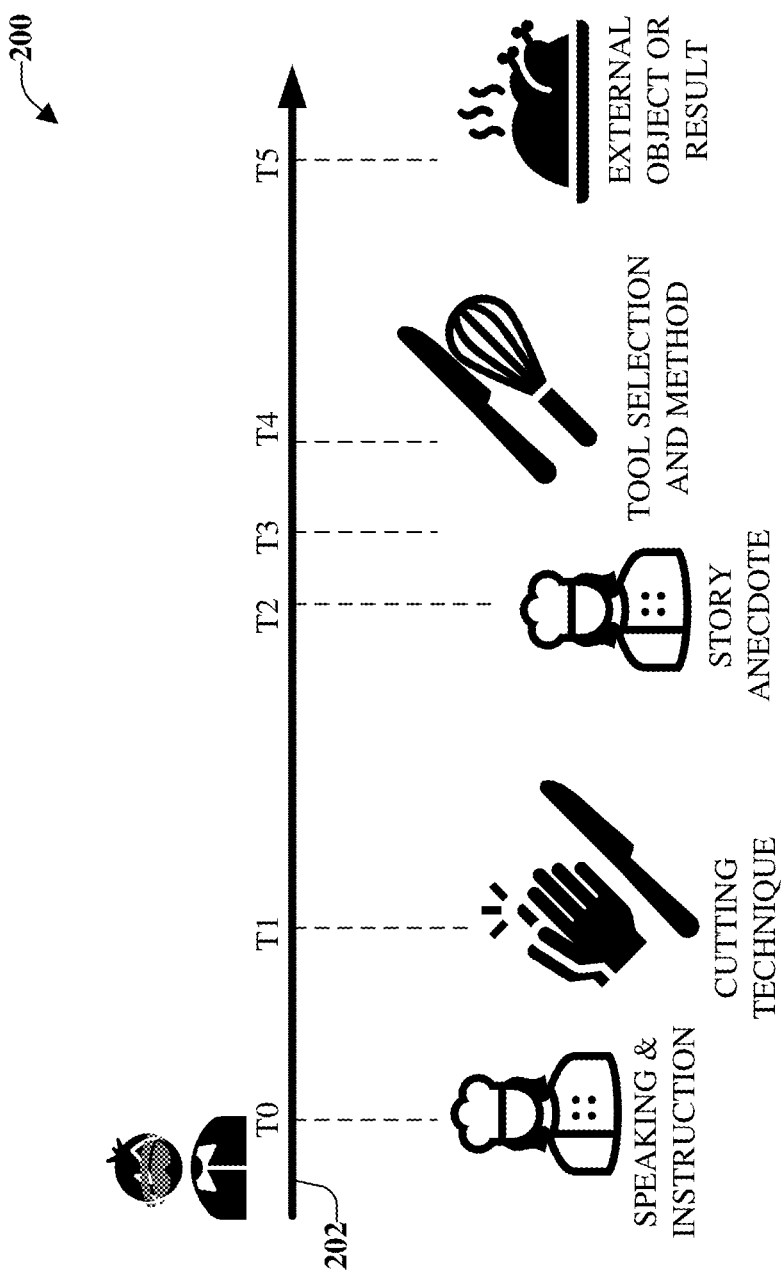
FIG. 2 illustrates an example, non-limiting, representation of a timeline of a learning experience in accordance with one or more embodiments described herein.

In further detail, FIG. 2 illustrates an example, non-limiting, representation of a timeline 200 of a learning experience in accordance with one or more embodiments described herein. Time 202 is represented along the horizontal line and incudes different times labeled as time T0, time T1, time T2, time T3, time T4, and time T5. At time T0, there can be speaking and instruction presented where a representation of the instructor is viewed. At time T1, a cutting technique can be presented and, thus, focus should be placed on the instructors hand and cutting instruments as compared to the facial and upper body representation of the instructor at time T0. Further, at time T2, the instructor can start a story anecdote and the focus can once again be brought to the instructors face. Then, at time T3 tool selection and method can be the focus, thus the camera view changes to the tools and/or instructor's hands, which can continue through time T4. Then, at time T5 an external object or result of the learning can be presented. Thus, if the focus of the camera is not changed at the different change points (e.g., time T1, time T2, time T3, time T4, an so on), it can be difficult for the learner to focus and determine exactly what is being presented. This is especially true at the points of time when the focus should be on the hands and/or the cooking instruments (e.g., learning a cutting technique, learning the different types of tools that can be used, and so on). Thus, the relevant portion of immersion should be the focus.

Figure 3:
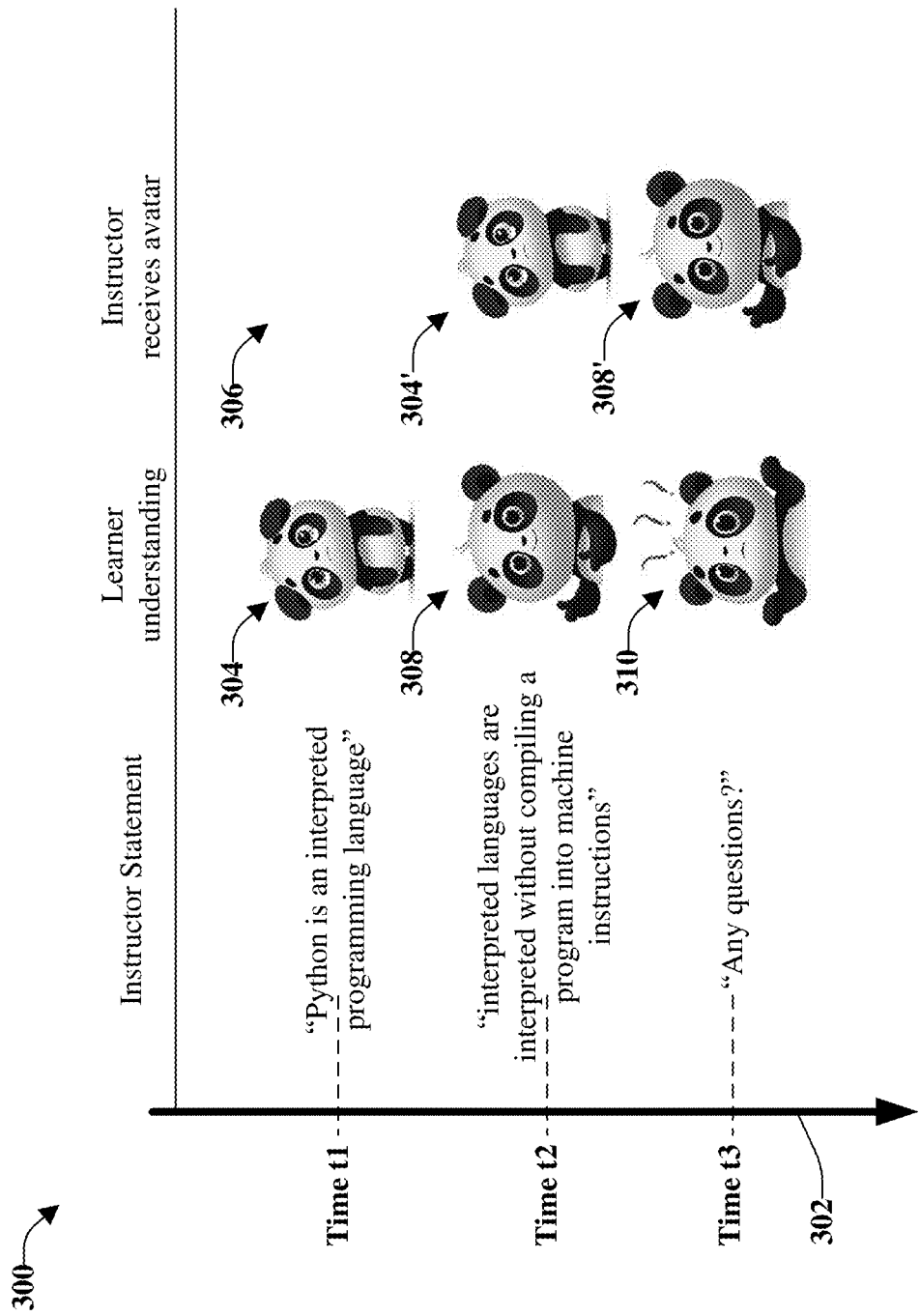
FIG. 3 illustrates an example, non-limiting, representation of a sentiment latency problem according to a traditional system.

FIG. 3 illustrates an example, non-limiting, representation of a sentiment latency problem 300 according to a traditional system. In this example, time 302 is represented along the vertical axes and includes time t1, time t2, and time t3. At time t1, the instructor outputs the statement "Python is an interpreted programming language." The learner understanding is represented as an avatar 304 (in this example a panda bear) that does not have much emotion. Further to this example, at time t1, the instructor does not receive an avatar representing the student, as indicated at 306.

At time t2, the instructor outputs the statement "interpreted languages are interpreted without compiling a program into machine instructions." The learner's understanding of this statement is represented as a happy avatar 308. Also at time t2, the instructor receives the avatar 304', which is the avatar 304 from the previous statement at time t1. Thus, the instructor can be unclear or confused about the learner's understanding.

Further, at time t3, the instructor asks if there are any questions. The learner has questions and is confused about the lesson, as indicated by the avatar at 310. However, due to delays, the instructor receives the avatar from the previous time, as indicated by avatar 308' and, thus, is not aware of the learner's confusion.

To overcome the challenges as discussed with respect to FIG. 2 and FIG. 3, as well as other challenges, the various embodiments described herein, can detect different context states and switch among the different context sates, as needed, in the current immersion (e.g., support case or educational experience). Further, the disclosed aspects can utilize an avatar to represent a real human during learning the interaction. Different avatars with different faces (or other expressive features) can be recommended and/or automatically output based on a better learning outcome, which can be via machine learning match according to some implementations, which will be discussed in further detail below.

Figure 4:
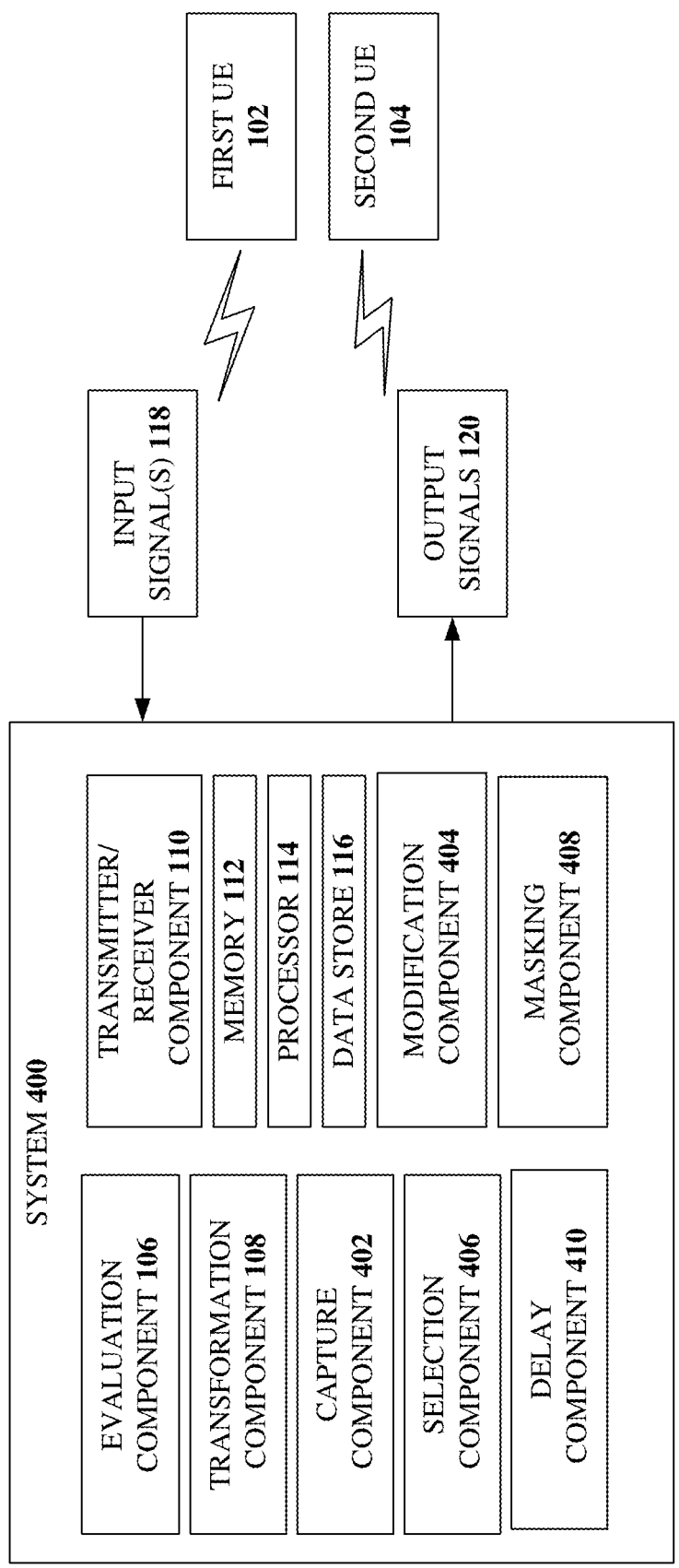
FIG. 4 illustrates an example, non-limiting, system that selectively modifies an avatar representation during a videotelephony session in accordance with one or more embodiments described herein.

FIG. 4 illustrates an example, non-limiting, system 400 that selectively modifies an avatar representation during a videotelephony session in accordance with one or more embodiments described herein. Repetitive description of like elements employed in other embodiments described herein is omitted for sake of brevity. The system 400 can be configured to perform functions associated with the system 100 of FIG. 1, other systems, other processes, and/or computer-implemented methods discussed herein.

As illustrated, the system 400 can include a capture component 402, a modification component 404, a selection component 406, a masking component 408, and a delay component 410. The capture component 402 can be configured to record interaction associated with the first UE 102 (e.g., interaction of a first entity with the first UE 102). The recorded interaction can be retained in the at least one memory 112, the at least one data store 116, another system component, and/or external to the system 400. Although discussed with recording the interactions, according to some implementations, the interactions are not recorded (e.g., stored) and are modified in real-time (or near real-time) as discussed herein.

The transformation component 108 can transform an actual representation of a first entity into an avatar representation. Such transformation can mitigate and/or reduce an amount of bandwidth consumed (or bit rates) during transmission and consumption of the content that comprises avatar representations at the first UE 102 and/or at the second UE 104. According to some implementations, the transformation component 108 can select an avatar such that an emotional state of the first entity can be conveyed to others participating in the session.

Figure 5:
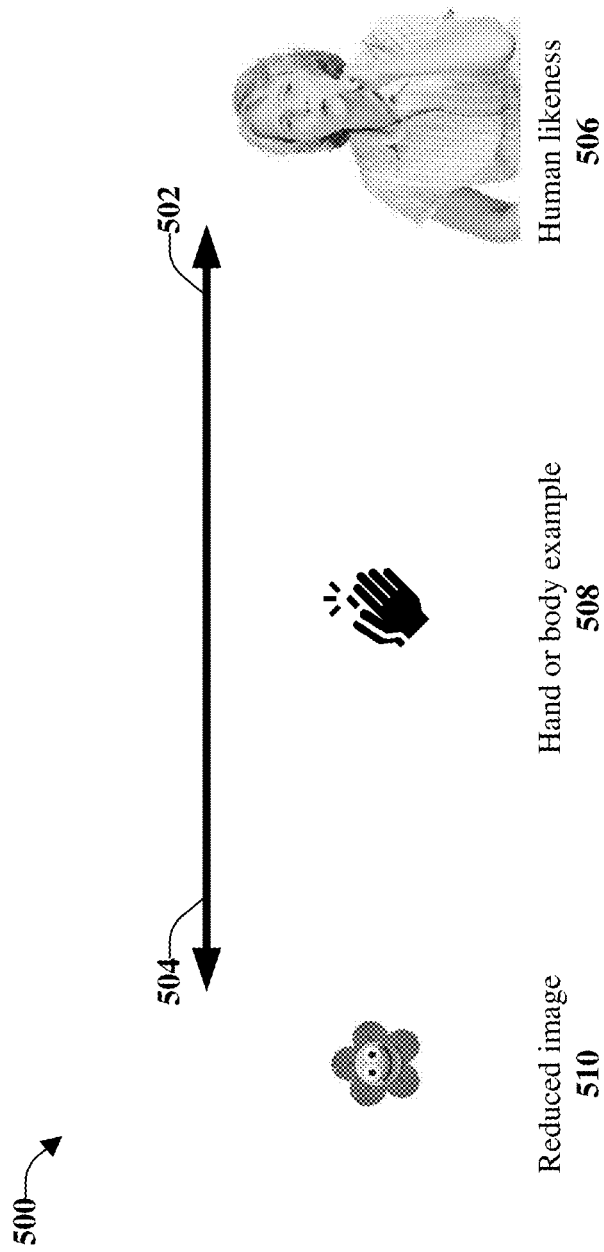
FIG. 5 illustrates a complexity continuum in accordance with one or more embodiments described herein.

For example, FIG. 5 illustrates a complexity continuum 500 in accordance with one or more embodiments described herein. Repetitive description of like elements employed in other embodiments described herein is omitted for sake of brevity. The complexity is represented along the dotted line wherein a first side of the line represents a large amount of complexity 502 (e.g., a higher amount of bandwidth is used to transmit and/or output the video feed and/or the one or more output signals 120) and the second side of the line represents a smaller amount of complexity 504 (e.g., a lower amount of bandwidth is used to transmit and/or output the video feed and/or the one or more output signals 120).

As discussed herein, the disclosed aspects can automatically adjust the complexity continuum 500. Thus, when a human likeness 506 is received (e.g., as one or more input signals 118), the system 400 can adjust the complexity downward to only focus on a hand or body 508 (or other portion), or even further down the complexity continuum 500 to a reduced image 510, which can be an avatar representation, for example. Thus, as needed, the system 400 (e.g., via the modification component 404 or another system component) can automatically reduce and/or mitigate an amount of complexity and/or increase an amount of complexity depending on the desired output (e.g., the one or more output signals 120).

The modification component 404 can be configured to automatically select the output character (e.g., the human likeness 506, a focused portion (e.g., the hand or body 508), an avatar representation, the reduced image 510, and so on). In this case, the system 400 dynamically determines the output image. However, the disclosed aspects are not limited to this implementation and, instead, the viewer or participant can select the avatar via providing an input at their respective device, which is received by the selection component 406 (e.g., via the transmitter/receiver component 110).

There can be various types of avatars including, for example, emoji-level avatars, live-avatars, and hybrid avatars. Use of the emoji-level avatars do not need access to the learner's camera (e.g., respective cameras or other capture components of the first UE 102 and the second UE 104). Instead, the learner can select (e.g., via the selection component 406) their own emoji to represent their current learning state. The selection of the avatar can be in response to a prompt or other output requesting the selection. For example, the selection component 406 can output (e.g., via the transmitter/receiver component 110) a request (e.g., the one or more output signals 120) for the participant to make a selection of an avatar from a group of avatars. Such output can facilitate a rendering, at the first UE 102, of a prompt or other selection inquiry.

The live-avatar solution can utilize access to the learner's camera, but instead of displaying the learner (e.g., the human likeness 506), the avatar is displayed with the learner's gestures (e.g., the hand or body 508) replaced in real-time and/or in substantially real-time. The hybrid avatar option can allow the respective cameras of the UEs (e.g., the first UE 102, the second UE 104) to translate to emoji, thumbs-up, and/or another emotion or listening state.

The participants can interact with their respective devices via respective interface components (not shown). The interface components can provide a Graphical User Interface (GUI), a command line interface, a speech interface, Natural Language text interface, and the like. For example, a GUI can be rendered that provides an entity with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the entity did want the action performed.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alpha-numeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (VGA)) with limited graphic support, and/or low bandwidth communication channels.

It is noted that the terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

According to some implementations, the masking component 408 can use one or more avatars to capture (or remove) a human and/or other objects in the background or other portions of a captured image and/or captured audio to protect privacy. For example, through using leader and/or teacher interactions, the part of the student and/or remote interaction that should be captured and transmitted can be determined. In a similar manner, a background or non-essential content can be identified and removed from the scene, or capture of background and/or other non-essential content can be avoided.

Further, according to some implementations, features of a speaker and/or teacher can be masked to provide privacy. For example, by representing a human as an avatar, various features of the human (e.g., age, gender, nationality, and so on) can be masked from other participants.

Additionally, the disclosed aspects can use the avatar's facial expressions to better help the leader understand the learner's need at different situations. For example, image classification can be used to name the learner's current emotional and/or psychological state (e.g., confused, attentive, following, and so on). In another example, an overall summary of the classroom's cognitive state can be shared with the instructor in real-time (or nearly real-time) to guide the instructor to know when to stop or slow down, for example.

Figure 6:
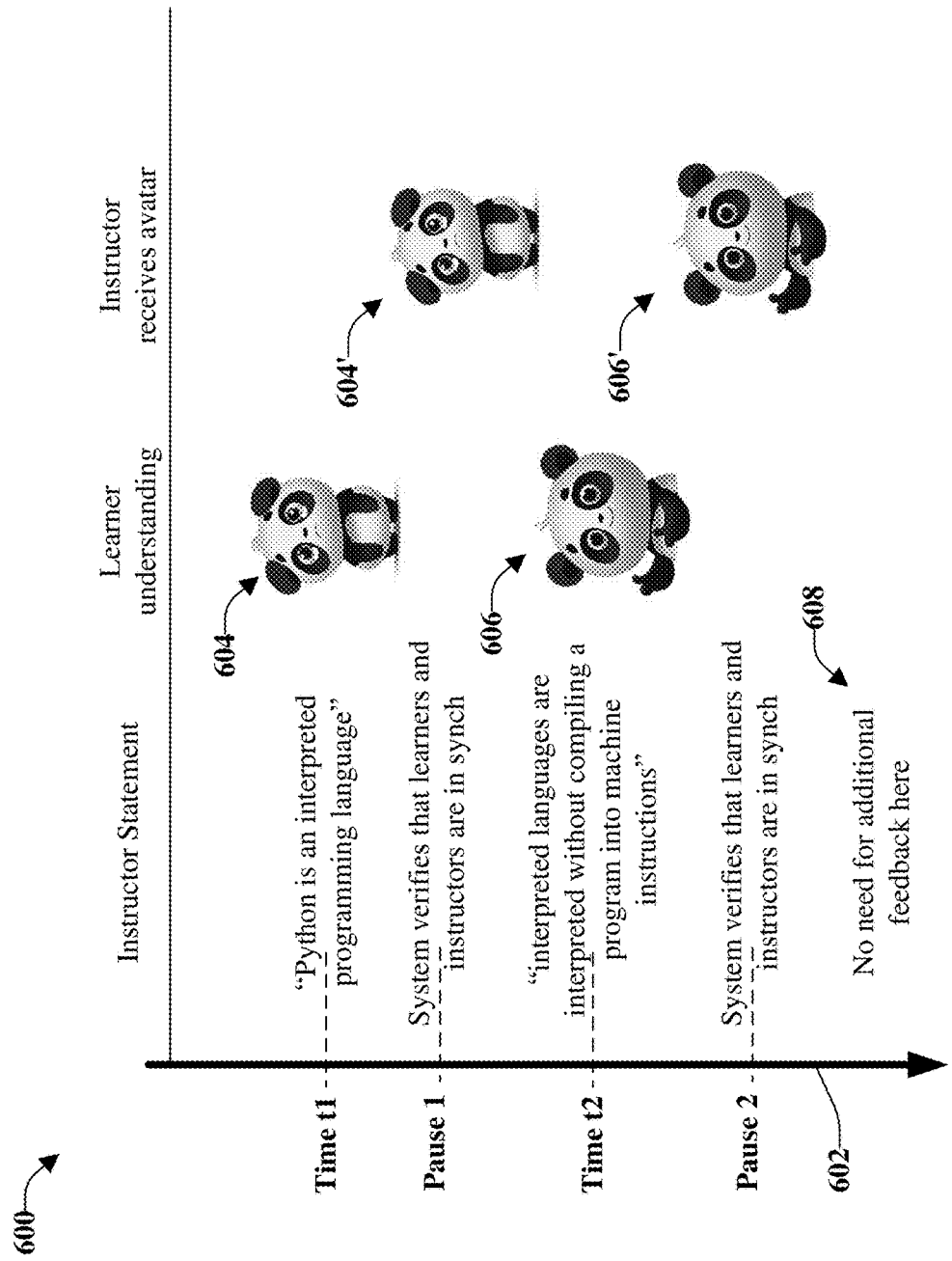
FIG. 6 illustrates an example, non-limiting, representation of latency introduced to facilitate synchronization among participants in accordance with one or more embodiments described herein.

To facilitate the rendering of the appropriate avatars and/or to facilitate understanding between a learner and a student, the delay component 410 can introduce one or more delays or pauses during the interaction to ensure that the participants are synchronized with one another. For example, using the example of FIG. 3, FIG. 6 illustrates an example, non-limiting, representation 600 of latency introduced to facilitate synchronization among participants in accordance with one or more embodiments described herein. Repetitive description of like elements employed in other embodiments described herein is omitted for sake of brevity.

In this example, time 602 is represented along the vertical axes and includes time t1, pause 1, time t2, and pause 2. At time t1, the instructor outputs the statement "Python is an interpreted programming language." The learner understanding is represented as an avatar 604 (in this example a panda bear) that does not have much emotion. In order to synchronize the learner understanding and the instructor's acknowledgement of the learner understanding, the delay component 410 temporarily pauses the output stream (e.g., streaming content, the one or more output signals 120), as indicated by pause 1. This pause allows the system to verify that the learner and the instructor are synchronized (e.g., in sync) with one another. During this pause, the instructor receives the avatar 604', which is the avatar 604 of the learner understanding from the previous statement at time t1.

At time t2, the instructor outputs the statement "interpreted languages are interpreted without compiling a program into machine instructions." The learner's understanding of this statement is represented as a happy avatar 606. In order to synchronize the learner understanding and the instructor's acknowledgement of the learner understanding, the delay component 410 temporarily pauses the output stream (e.g., streaming content, the one or more output signals 120), as indicated by pause 2. This pause allows the system to verify that the learner and the instructor are synchronized (e.g., in sync) with one another. During this pause, the instructor receives the avatar 606', which is the avatar 606 of the learner understanding from the previous statement at time t2.

The process of pausing at certain points during the session can continue until the end of session. At the end of the session, as indicated at 608, there is no need for additional feedback here since the pauses (pause 1, pause 2, and/or other pauses) allow for the synchronization. Compare this to FIG. 3, where, at time t3, the instructor has to ask if there are any questions since synchronization has not occurred, or it is unclear is such synchronization has occurred.

Figure 7:
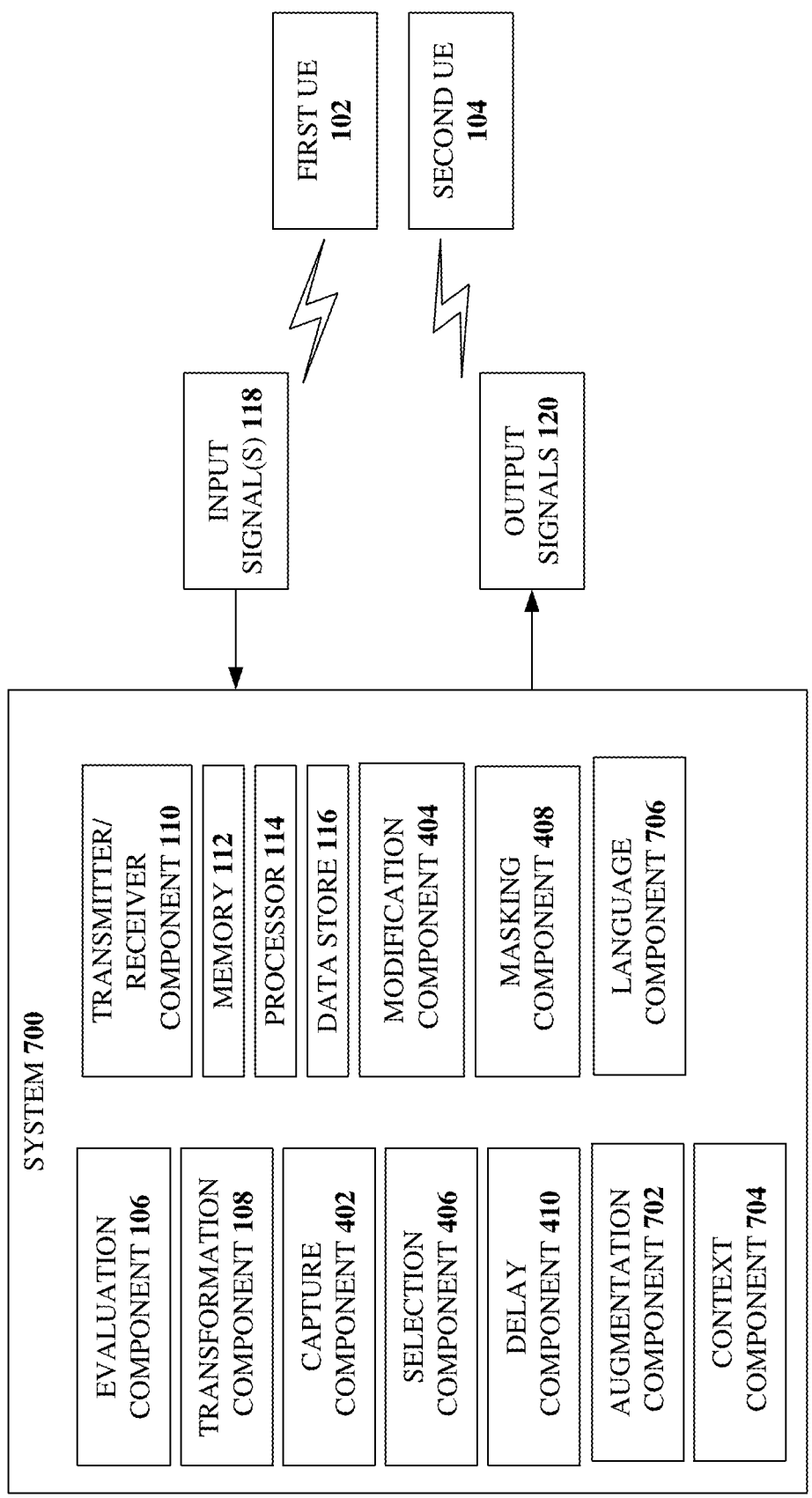
FIG. 7 illustrates an example, non-limiting, system for selectively modifying and rendering content associated with participants of videotelephony sessions in accordance with one or more embodiments described herein.

FIG. 7 illustrates an example, non-limiting, system 700 for selectively modifying and rendering content associated with participants of videotelephony sessions in accordance with one or more embodiments described herein. Repetitive description of like elements employed in other embodiments described herein is omitted for sake of brevity. The system 700 can comprise one or more of the components and/or functionality of the system 100, the system 400, and vice versa.

The system 700 includes an augmentation component 702, a context component 704, and a language component 706. The augmentation component 702 can be configured to augment voice content of one or more participants. The augmentation of the voice content can facilitate masking an identity of the participant. For example, an instructor might be a 12 year old child and the students might be adults. Therefore, it might be determined that the identity of the instructor should be augmented such that the instructor appears to be an adult. In some implementations, the masking component 408 and the augmentation component 702 can cooperate to modify one or more respective features or respective parameters of participants.

The context component 704 can be configured to determine that a context or modality of a presentation (or of a current speaker) has changed. With reference again to FIG. 2, the modality might change from verbal instructions (e.g., speaking and instruction) to cutting techniques using the hands. The context component 704 can evaluate the audible and visual portions of the captured data (e.g., the one or more input streams) and automatically change the context from a first context (e.g., verbal context) to a second context (e.g., visual context), or vice versa.

By way of example and not-limitation, for videotelephony sessions that are educational in nature, the instructor can change modalities (e.g., between speech and demo). Thus, the context component 704 can select the portion of an avatar that is needed for the instruction. For example, in cooking, dialog of the interaction might be more critical during recipe selection and cooking temperatures and hand view might be more appropriate during cutting the ingredients. Thus, the context component 704 can detect what is occurring, which can be facilitated via a natural language processor. In some implementations, an expected timeline of the course can be uploaded prior to the course and can be utilized by the context component 704 to facilitate the changes between the different modalities.

In another example of an education environment, a participant (or other entity) can request the system 700 to manipulate what is shown in the immersion while the main instructor is delivering a core message and discussion. This can increase the number of presenters to mix and match the immersion. According to some implementations, switching to different data channels (e.g. different quality feeds or different camera views) can be performed. For example, the system 700 could use different feeds and/or angles of the same event can be adapted while dynamically choosing the one that was most helpful for instruction.

In another example, in playback of a learning experience, only the most relevant portions need to be transmitted and displayed. For example, if a participant is learning to work with their hands or as asked to look at a specific object, immersion can be extracted and overlaid (e.g., in an Augmented Reality (AR) style) to the problem being discussed instead of specifically zooming and/or selecting to bring focus to that part of the presentation.

The language component 706 can detect the language spoken by the participants and can change the languages so that both participants can understand one another. For example, the language component 706 can determine that a first language spoken by the first entity and a second language spoken by the second entity are different languages. Based on this knowledge, the language component 706 can convert the first language into the second language for consumption by the second entity. Additionally, the language component 706 can convert the second language into the first language for consumption by the first entity.

According to some implementations, the evaluation component 106 can monitor, among other items, first facial expressions of a first user and second facial expressions of a second user. The first user can be associated with the first UE 102 and the second user can be associated with the second UE 104. The first user and the second user (and additional users depending on the number of participants) are engaged in an interactive videotelephony session via network equipment that is part of a communication network. Based on the first facial expressions of the first user, the transformation component 108 can transform a first visual representation of the first user into a first avatar representation that mimics the first facial expressions of the first user. Further, based on the second facial expressions of the second user, the transformation component 108 can transform a second visual representation of the second user into a second avatar representation. The first avatar representation and the second avatar representation are respectively rendered via the first UE 102 of the first user and the second UE 104 of the second user.

When source content lacks existing annotation, various processes for annotation can be utilized to detect and/or edit content. These processes include, for example, object detection and/or speaker detection processes that can be applied to automatically parse and/or segment the source content. For example, audio, motion, and/or vocal cues for one or more pauses can be utilized to detect scene cuts and different time points. Another example is the utilization of object detection to determine a recurring object of interest. Yet another example is correlation of a person's face and/or likeness in order to determine major characters or cast within content. In still another example, speech to text and/or video to text processes can correlate the currently display content with the topic of discussion to determine proper items of interest for slow motion, pauses, and/or additional enhancement.

Further to the above implementations, the modification component 404 can determine a learning mode associated with the interactive videotelephony session. Upon or after the determination of the learning mode, the transformation component 108 can change at least one feature of the second avatar representation based on the learning mode. Additionally, the system, via the transmitter/receiver component 110 can facilitate (e.g., via one or more output signals 120) a first rendering of the first avatar representation on a first display of the second user equipment and a second rendering of the second avatar representation on a second display of the first user equipment.

In accordance with some implementations, the modification component 404 can perform discovery of needed interaction mode in a current learning model. For example, different learning habits and/or different learner backgrounds might need different avatars in order to achieve a better outcome.

According to some implementations, the masking component 408 and/or the augmentation component 702 can perform gradual user transition to hide, mute, blur, and so forth different aspects (e.g., face, hands, mouth, and so on). For example, in order to protect privacy, during the learning stage, there might be a need to actively pause the interaction by performing the above operations, which provides an easier transition and/or environment as compared to traditional systems (e.g., where the learner just steps out or disappear from the viewing window/picture).

As discussed, with the various aspects provided herein, controls for the leader to enable one or more functionalities of the system are provided, which can be similar to being able to mute one or more participants. For example, the leader will have more control of the class in order to provide a better learning environment which is much harder to do in the in-person learning setup. This is one of the virtual learning environment advantages compared to traditional in-person learning.

The various aspects discussed herein can also assist in "latency" issues that contribute to awkward conversations/learning/understanding (e.g., via the delay component 410). Metrics can be associated with a participant indicating they are lost or to slow down. For example, due to technical or personal challenges, there is a need to individualize the learning experience with avatar options as discussed herein.

Further, the various aspects can automatically discover a cohort that is "stuck" or with similar usage patterns. For example, it can be detected that multiple articulation streams (e.g., waving hands, or finger interactions) are not fully synchronized from the speaker to recipient. Thus, the speaker can be sent notifications or avatar-based highlights. The determination of whether a person is stuck or that something is important can be based on a certain bitrate or activity that is happening more frequently and detection of the anomaly (e.g., they only do this for one minute instead of for twenty minutes). In another example, visual attention can also be used to augment behavioral changes (e.g. gaze, face, movements) for activity (e.g. ad consumption, engagement, and so on).

Figure 8:
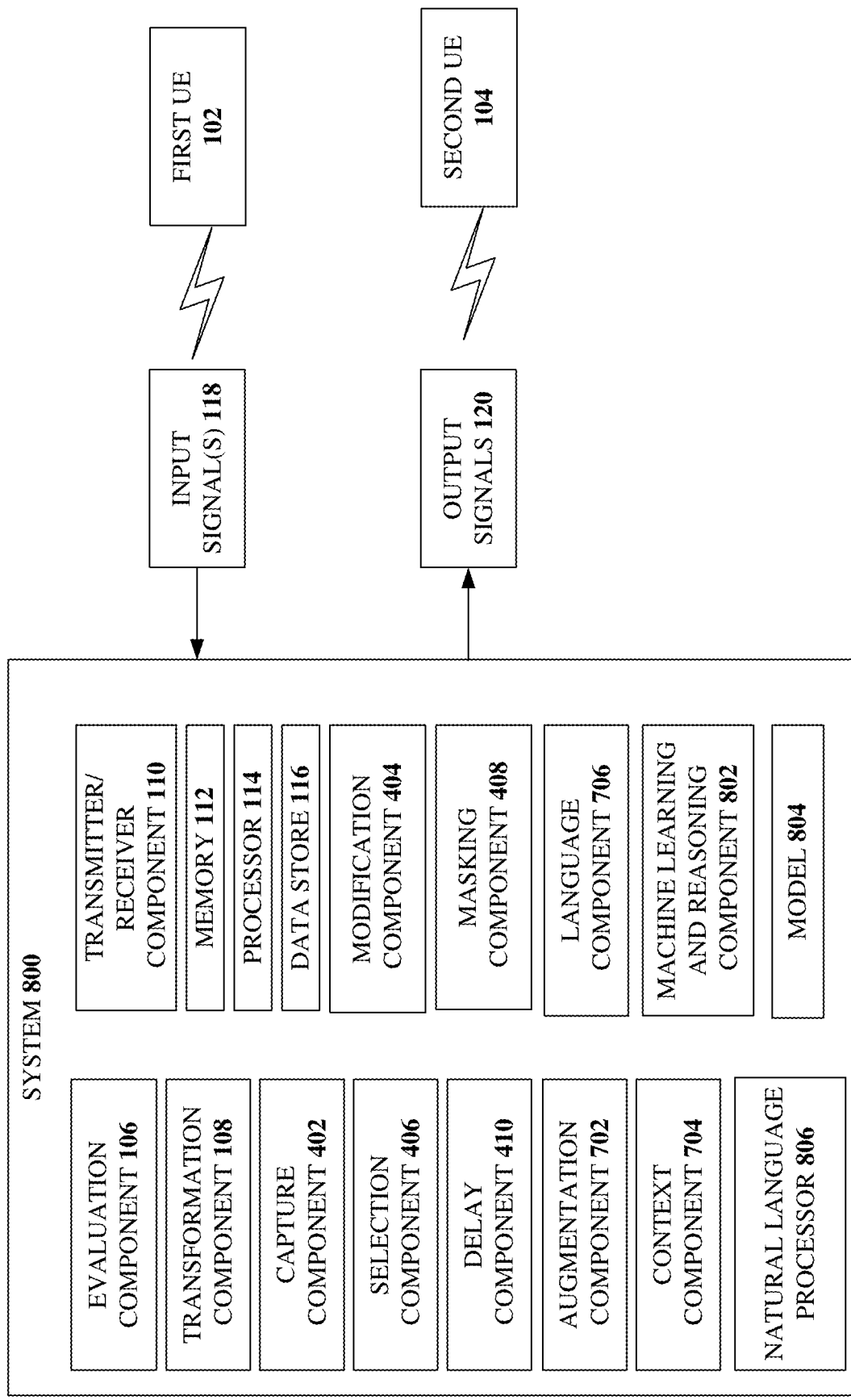
FIG. 8 illustrates an example, non-limiting, system that employs automated learning that trains a model to facilitate one or more of the disclosed aspects in accordance with one or more embodiments described herein.

FIG. 8 illustrates an example, non-limiting, system 800 that employs automated learning that trains a model to facilitate one or more of the disclosed aspects in accordance with one or more embodiments described herein. Repetitive description of like elements employed in other embodiments described herein is omitted for sake of brevity. The system 800 can comprise one or more of the components and/or functionality of the system 100, the system 400, the system 700, and vice versa.

The system 800 can utilize machine learning to train a model to identify an opportunity to perform avatar modification to facilitate understanding and collaboration during a videotelephony session. The model can be trained to a defined confidence level, which can be a confidence level that is determined to be at a high enough level to achieve goals associated with understanding and collaboration during a videotelephony session.

As illustrated, the system 800 can comprise a machine learning and reasoning component 802 that can be utilized to automate one or more of the disclosed aspects based on training a model 804. The machine learning and reasoning component 802 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 802 can employ principles of probabilistic and decision theoretic inference. Additionally, or alternatively, the machine learning and reasoning component 802 can rely on predictive models (e.g., the model 804) constructed using automated learning and/or automated learning procedures. Logic-centric inference can also be employed separately or in conjunction with probabilistic methods.

The machine learning and reasoning component 802 can infer whether information indicative of one or more participants of a videotelephony session should be modified and represented as an avatar, which avatars should be utilized, whether to mask or otherwise obscure one or more objects or persons in a viewing range, whether to change an identity of one or more participants, whether to change a modality of a view associated with one or more participants, and so forth.

As used herein, the term "inference" refers generally to the process of reasoning about or inferring states of a system, a component, a module, an environment, and/or devices from a set of observations as captured through events, reports, data and/or through other forms of communication. Inference can be employed to identify when to display an avatar, the type of avatar to display, when to temporarily pause streaming content to enable synchronization between UEs, inferring a state of a participant (which can be facilitated via natural language processing implemented by a natural language processor 806), or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with rendering information indicative of interactions (e.g., gestures, actions, spoken words, sounds such as music, and so on) of participants in a videotelephony session in 5G communication networks, 6G communication networks, new radio communication networks, and/or other advanced networks) can employ various artificial intelligence-based schemes for carrying out various aspects thereof. For example, a process for determining if one or more participants should be represented as an avatar, selection of emotions expressed or conveyed through use of the avatars, voice modification, changing views, and so on can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine whether activation and/or deactivation of an avatar modification or more than one avatar modification should occur and how such avatars should be presented.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing entity feedback associated with an avatar that has been output and/or verbal communications by receiving extrinsic information (e.g., one or more signals from the equipment), by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when to change a viewing angle, which avatar to select from a group of avatars, when to mask or obscure objects and/or people in a field of view, and so forth. The criteria can include, but is not limited to, historical information, feedback information, measured reactions, an increase in the amount of engagement by one or more entities, and so forth.

Additionally, or alternatively, an implementation scheme (e.g., a rule, a policy, and so on) can be applied to control and/or regulate avatar selection and rendering according to information known about the participants (e.g., age, gender, preferences, historical interactions, and so on). In some implementations, based upon a predefined criterion, the rules-based implementation can automatically and/or dynamically change an avatar and/or audible output to be more interesting to the participants and/or to mitigate an amount of bandwidth associated with rendering the session based on UE capabilities and/or processing power. In response thereto, the rule-based implementation can automatically interpret and carry out functions associated with avatar modification, by employing a predefined and/or programmed rule(s) based upon any desired criteria. In further detail, the system 800 can continually monitor expressions, emotions, and/or vocal inflections to determine if an avatar or other output mechanism should be changed (e.g., via the machine learning and reasoning component 802).

According to some implementations, seed data (e.g., a data set) can be utilized as initial input to the model 804 to facilitate the training of the model 804. In an example, if seed data is utilized, the seed data can be obtained from one or more historical data associated with other videotelephony sessions, historical or current bandwidth consumption of devices participating in the videotelephony session (including feedback data) in the communication network. However, the disclosed embodiments are not limited to this implementation and seed data is not necessary to facilitate training of the model 804. Instead, the model 804 can be trained on new data received (e.g., the one or more input signals 118, a feedback loop, and so on).

The data (e.g., seed data and/or new data) can be collected and, optionally, labeled with various metadata. For example, the data can be labeled with an indication of the participants of the session, a type of learning environment, and other data related to the participants and/or the material being conveyed.

In an example, the machine learning and reasoning component 802 can apply sentiment analysis for one or more (or even all) active learner and instructor data feeds. For example, the machine learning and reasoning component 802 can be, or can be associated with, an image classification model that is trained over facial expressions conveying a variety of emotions, which can be used to categorize the learner's current emotional state. In some implementations, other modalities, such as voice, interactions, gestures, cadence, and so forth can also be used. Metrics can include, but are not limited to: excitable, comprehension, willingness to demonstrate; recent history for attentiveness by different content source, and so on.

The sentiment analysis performed by the machine learning and reasoning component 902 and/or a natural language processor 906 can be on the emojis and/or avatars and can be utilized to alert another participant (e.g., an instructor, a speaker, and so on) of problem areas or other concerns at substantially the same time as they occur. For example, if many people have a face of confusion, information related to the confusion can be helpful to the speaker or other participant to know whether to cover a topic again, slow down the content, or to perform another action. Similar information can be used for other reactions. For example, if everyone is engaged and looks happy, the speaker might be able to speed up the presentation and/or move on to a different topic, and so on. As another example, the intensity of a speaker's words, pitch, tone, cadence, and so on can be analyzed and sentiment analysis performed based on this information.

In an example, the modification component 404 can highlight one or more portions of an output stream. For example, useability from a participant's perspective can include the ability of the modification component 404 to highlight or otherwise draw attention to a focus point in the streaming content (e.g., data feed). For example, in a music lesson, the instructor's hands might be highlighted. For a music lesson or acting lesson, the mouth or other parts of the face can be highlighted, and so on. Accordingly, the modification component 404 (as well as other system components) can determine what the learner needs to have or should focus on and the avatars representation of the teacher can be enabled to augment the learning context.

Various manners of detecting and highlighting the content can be utilized such as, for example, object detection and/or speaker detection. In another example, various cues (e.g., audio cues, motion cues, and/or vocal cues) can be utilized to determine when there are pauses, which might indicate a change or emphasis at a particular potion of the feed. In another example, a recurring object of interest can be determined and attention focused on that object.

Figure 9:
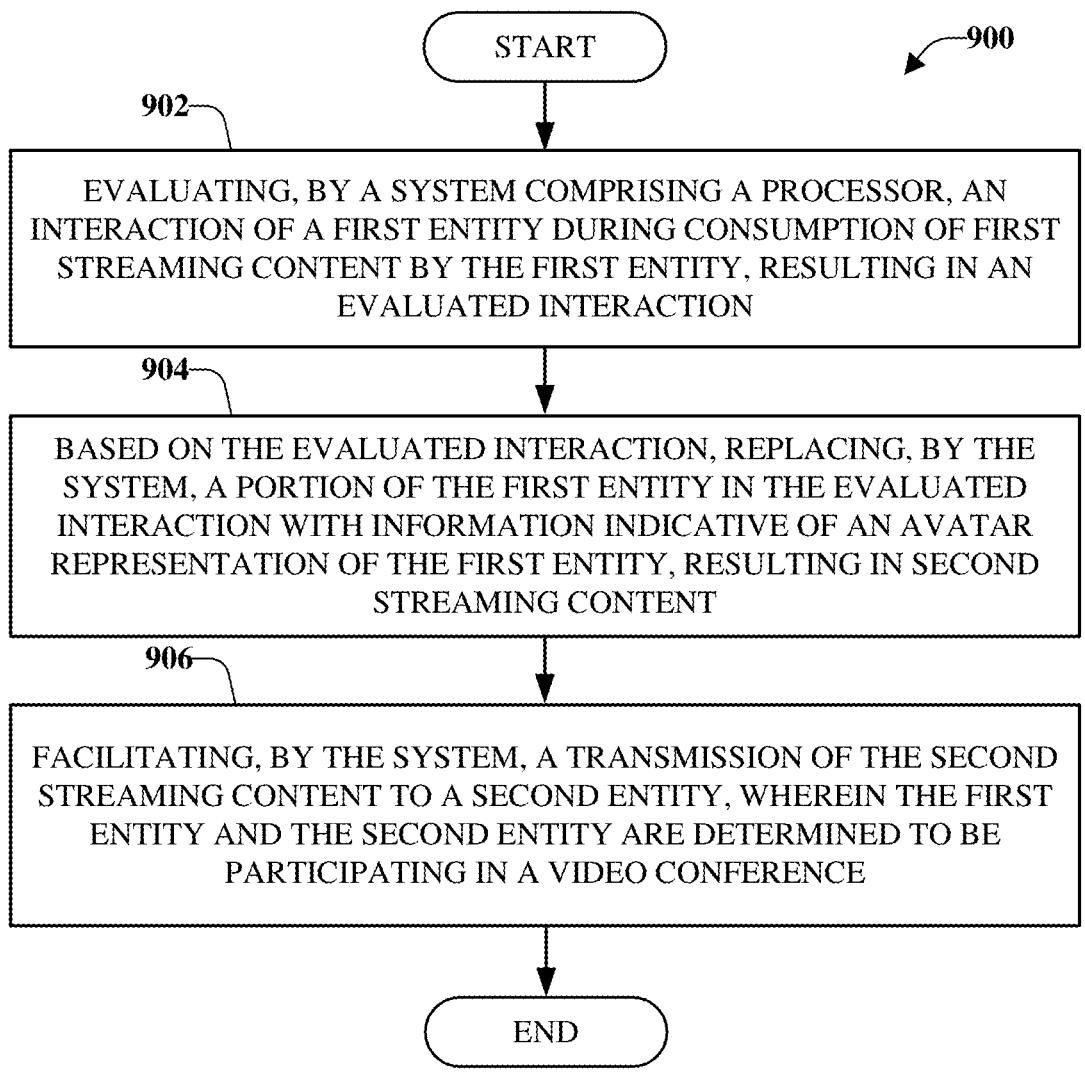
FIG. 9 illustrates an example, non-limiting, computer-implemented method for facilitating alteration of one or more avatars in an interactive videotelephony session in accordance with one or more embodiments described herein.

FIG. 9 illustrates an example, non-limiting, computer-implemented method 900 for facilitating alteration of one or more avatars in an interactive videotelephony session in accordance with one or more embodiments described herein. Repetitive description of like elements employed in other embodiments described herein is omitted for sake of brevity. The computer-implemented method 900 can be implemented by a system including a memory and a processor, user equipment including memory and a processor, network equipment including a memory and a processor, a network controller including a memory and a processor, or another computer-implemented device including a memory and a processor.

In an example, content (e.g. a streaming video in 2D or images) for the example in FIG. 2 may be well edited and properly have the corresponding edits, crops, and cues already included in the existing content form. However, when the source content lacks this rich annotation, existing video segmentation, object detection, and speaker detection methods may be applied to automatically parse and segment the source content. Some examples of this analysis include, but are not limited to, the following: audio, motion, or vocal cues for pauses may be utilized to detect scene cuts and different time points; object detection may be utilized to detect a recurring object of interest; correlation of one person's face or likeness may determine major characters or cast within content; and, speech to text or video to text methods may correlate the currently display content with the topic of discussion to determine proper items of interest for slow motion, pauses, or additional enhancement.

The computer-implemented method 900 starts, at 902, with evaluating an interaction of a first entity during consumption of first streaming content by the first entity, resulting in an evaluated interaction. According to some implementations, the evaluating can be performed at substantially the same time as the interaction is occurring. Further, in some implementations, the evaluation can be fed into a model (e.g., the model 804) for further processing via artificial intelligence (e.g., the machine learning and reasoning component 802).

At 904, based on the evaluated interaction, a portion of the first entity in the evaluated interaction is replaced with information indicative of an avatar representation of the first entity, resulting in second streaming content. As discussed, the avatar representation can be an emoji-level avatar, a live-avatar, and/or a hybrid avatar. Replacement of a portion of the first entity can mitigate an amount of bandwidth consumed during transmission and consumption of the second streaming content as compared to a video recording of the entity.

In some implementations, the computer-implemented method 900 can include, at 906, facilitating a transmission of the second streaming content to a second entity. The first entity and the second entity are determined to be participating in a video conference. Further, the first streaming content, the second streaming content, as well as other streaming content, are respective portions of a video conference.

Figure 10:
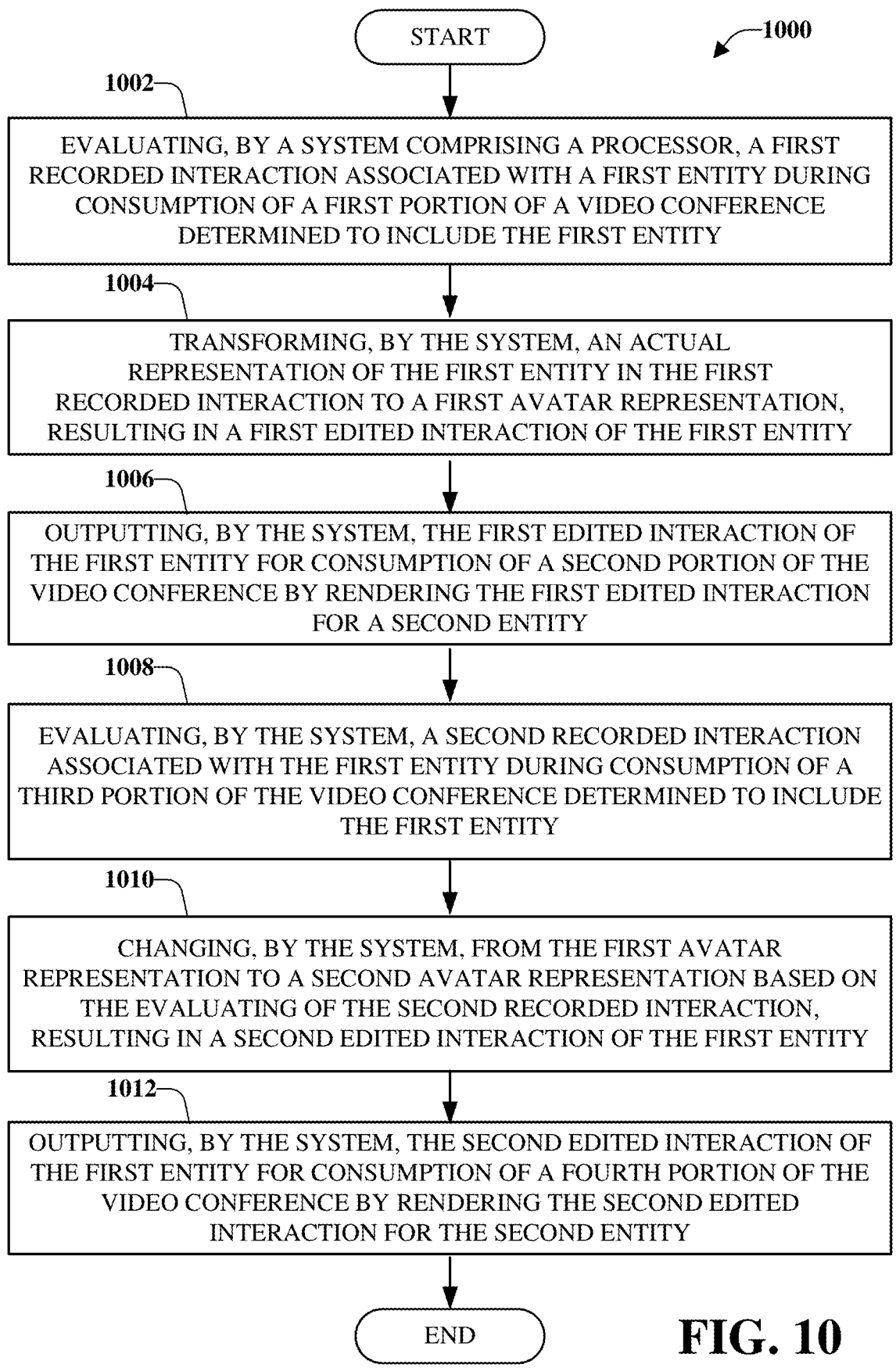
FIG. 10 illustrates an example, non-limiting, computer-implemented method for avatar modifications within an interactive videotelephony session in accordance with one or more embodiments described herein.

FIG. 10 illustrates an example, non-limiting, computer-implemented method 1000 for avatar modifications within an interactive videotelephony session in accordance with one or more embodiments described herein. Repetitive description of like elements employed in other embodiments described herein is omitted for sake of brevity. The computer-implemented method 1000 can be implemented by a system including a memory and a processor, user equipment including memory and a processor, network equipment including a memory and a processor, a network controller including a memory and a processor, or another computer-implemented device including a memory and a processor.

The computer-implemented method 1000 starts, at 1002, with evaluating a first recorded interaction associated with a first entity during consumption of a first portion of a video conference determined to include the first entity. At 1004, an actual representation of the first entity in the first recorded interaction is transformed to a first avatar representation, resulting in a first edited interaction of the first entity. Further, at 1006, the first edited interaction of the first entity is output for consumption of a second portion of the video conference by rendering the first edited interaction for a second entity.

Further, at 1008, the computer-implemented method 1000 evaluates a second recorded interaction associated with the first entity during consumption of a third portion of the video conference determined to include the first entity. At 1010, the first avatar representation is changed to a second avatar representation based on the evaluating of the second recorded interaction, resulting in a second edited interaction of the first entity. Further, at 1012, the second edited interaction of the first entity is output for consumption of a fourth portion of the video conference by rendering the second edited interaction for the second entity.

Figure 11:
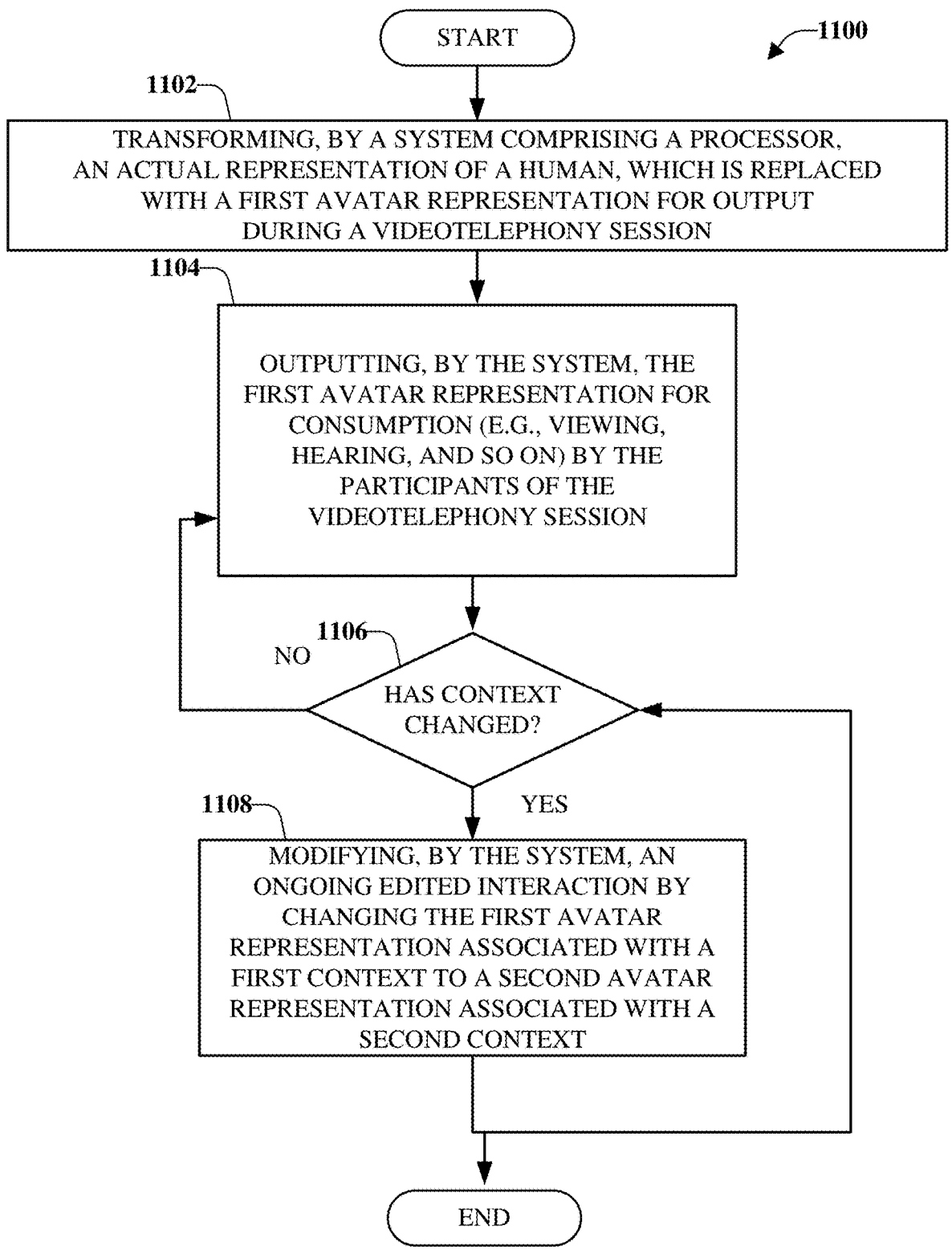
FIG. 11 illustrates an example, non-limiting, computer-implemented method for changing avatar representations based on a context of a videotelephony session in accordance with one or more embodiments described herein.

FIG. 11 illustrates an example, non-limiting, computer-implemented method 1100 for changing avatar representations based on a context of a videotelephony session in accordance with one or more embodiments described herein. Repetitive description of like elements employed in other embodiments described herein is omitted for sake of brevity. The computer-implemented method 1100 can be implemented by a system including a memory and a processor, user equipment including memory and a processor, network equipment including a memory and a processor, a network controller including a memory and a processor, or another computer-implemented device including a memory and a processor.

The computer-implemented method 1100 starts, at 1102, with transformation of an actual representation of a human, which is replaced with a first avatar representation for output during a videotelephony session. Further, at 1104, the first avatar representation can be output for consumption (e.g., viewing, hearing, and so on) by the participants of the videotelephony session.

At 1106, a determination is made whether a context (or modality) of the videotelephony session has changed, such as from a first context to a second context. If the context has not changed ("NO"), the computer-implemented method can return to 1104 and an ongoing video with the first avatar representation can continue to be output. If the context has changed ("YES"), at 1108, an ongoing edited interaction is modified by changing the first avatar representation associated with the first context to a second avatar representation associated with the second context. Thereafter the computer-implemented method 1100 can return to 1106 with another determination whether the context has changed. This can be recursive such that the context can change multiple times during a session and the avatar representations can change based on the context change. After completion of the session, the computer-implemented method 1100 ends.

Figure 12:
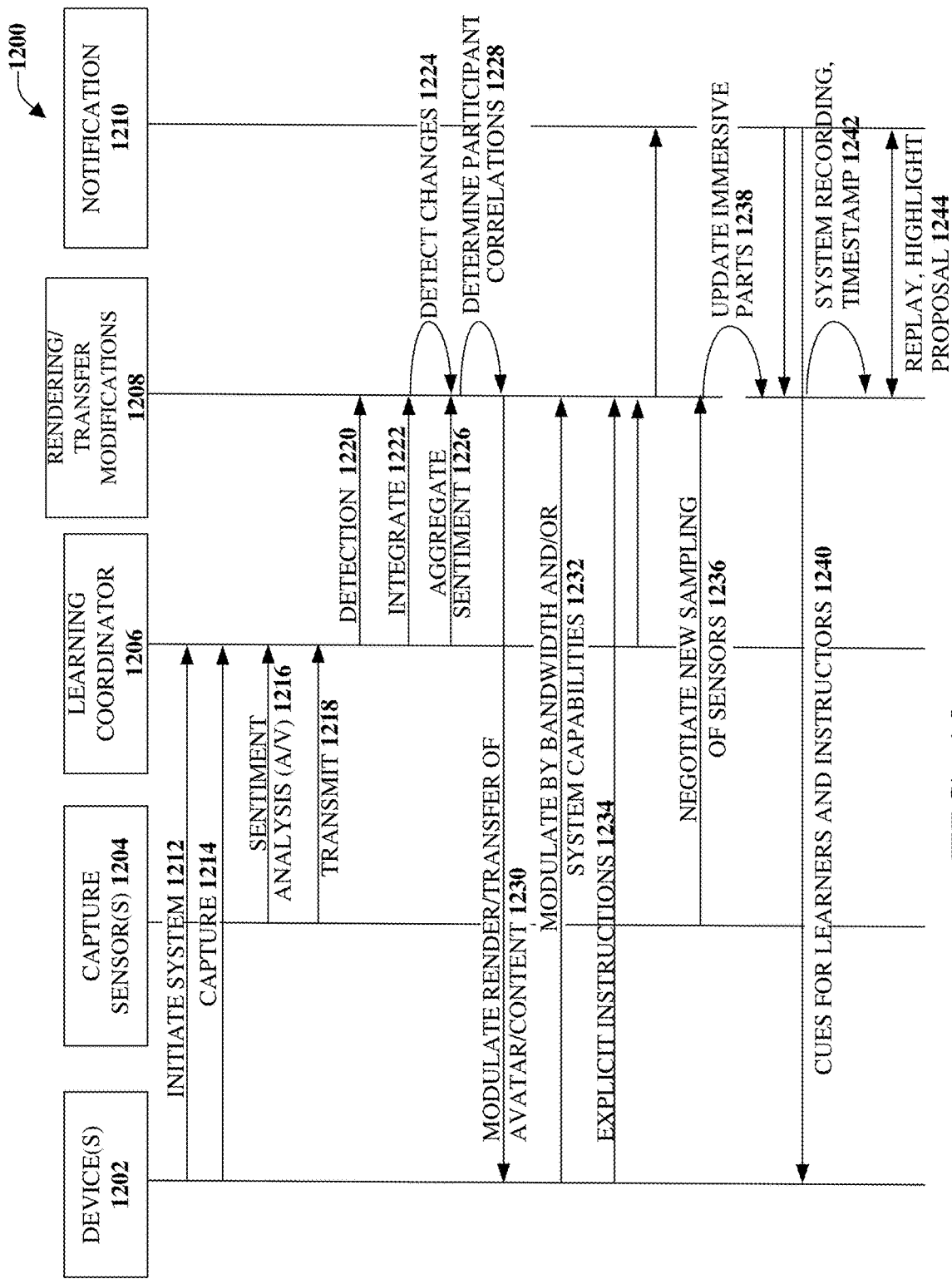
FIG. 12 illustrates an example, non-limiting, message sequence flow chart that facilitates avatar modifications for learning in accordance with one or more embodiments described herein.

FIG. 12 illustrates an example, non-limiting, message sequence flow chart 1200 that can facilitate avatar modifications for learning in accordance with one or more embodiments described herein. The message sequence flow chart 1200 can be utilized with different communication protocols (e.g., 5G, 6G, new radio, and other advanced communication protocols), as discussed herein. As illustrated, the message sequence flow chart 1200 represents the message sequence between one or more equipment (e.g., UEs 1202), one or more capture sensors 1204, a learning coordinator 1206, a rendering/transfer modifications portion 1208, and a notification portion 1210.

The system can be initiated, at 1212. The system initiation can occur upon or after one or more users (e.g., a learner, an instructor, and so on) log into the system via their respective devices. In an example, the instructor can choose a classroom type when the classroom is established and/or configured. Classroom types can include, but are not limited to, a live classroom, an avatar, and an emoji. Based on the classroom type choice, when learners log into the system, the learners may be asked to share their cameras, activate other IoT, give baseline testing for sentiment, and so on. The instructor, or more than one instructor, can receive such information according to some implementations.

As indicated at 1214, on the client-side (e.g., the first UE 102, the second UE 104, and so on), one or more interactions can be captured. The interactions can include, but are not limited to, behaviors, device interaction, speech or other audio content, and so on. For example, on the leader-side, avatar interactions and the devices and/or objects that are being centrally manipulated can be determined. The system can observe that part of the device and/or object is not essential for instruction and only voice or visual record is needed, for example. In some implementations, the instructor's current statement or topic needs can be tracked by the system. This could be accomplished by having the instructor's slides serve as a "timeline" of the entire experience.

At 1216 sentiment identification during capture can be performed. The system can also apply sentiment analysis for all active learner and instructor data feeds. For example, an image classification model, trained over facial expressions conveying a variety of emotions, can be used to categorize the learner's current emotional state. In some implementations, other modalities, such as voice, interactions, gestures, cadence, and so forth can also be used. Metrics can include, but are not limited to: excitable, comprehension, willingness to demonstrate; recent history for attentiveness by different content source, and so on.

Avatar components are transferred, at 1218, from the capture sensors 1204 to the learning coordinator 1206. The avatar components can include visual face and emotional scores, for example.

Next the avatar is generated. To generate the avatar, at 1220, relevant portions of the interaction are detected and selected for rendering. Integration of sentiment is performed, at 1222. Integration of the sentiment can include generating a map of the learner's face based on, selecting the central points of the face. Changes in the learner's face will be reflected on the avatar. Frequently used avatar expressions for this user can be cached in the classroom's bank of avatar images (e.g., a group of avatars from which one or more avatars can be selected). For the instructor and/or learner, the map of the learner's face can be transposed onto an avatar representation.

Changes in the sentiment and/or avatar parts can be detected at 1224. For example, the system can observe the representation that each learner and/or instructor is using. Thus, the system can determine whether the representation is an emoticon, a full body avatar, or something else.

The sentiment can be aggregated at 1226. Such aggregation can include aggregation of the classroom emotion state. For example, each of the learner's current psychological state are sent every x-minutes to a server for aggregation, where x is an integer greater than zero. The aggregation can be performed at the server-side after aggregating details from all participants. According to an optional implementation, the state can be updated instantly (or nearly instantly, in real-time or substantially in real-time) to pause and/or preempt moving to additional sections or certification.

In some implementations, the aggregation can be performed for individuals as well as entire class or cohorts. For example, the following can be a result of an aggregation:
In this classroom session, participants spent 81.4% of the time understanding today's content. The median duration of understanding was 38 minutes. Participants reported confusion most frequently during the topic of Interpreted Programming Languages.

The aggregation by the entire class can facilitate the interaction in a one-to-many relationship where a teacher has a large number of students (e.g., 50 students) and it is not practical for the teacher to view that many video feeds. Thus, the students can be aggregated as avatars and analytics can be provided to automatically detect the states of the students, and also reduce an amount of bandwidth needed for the session or to recommend to the instructor that small group sessions are needed at this time given aggregated statistics about the learners' confusion. The aggregate avatar statistics can also be used to suggest to the instructor which students should be placed together in the smaller group sessions. At 1228, the system determines correlation between participant's (e.g., learner and instructor) sentiment to determine format generation anomalies.

During operation, the system might suggest or automate switching of generation modality. For example, the system might suggest a modulate render and/or transfer of avatar and/or content, at 1230. The system can be sensitive to each client's capabilities and bandwidth. Thus, at 1232, the system can modulate by bandwidth and/or system capabilities. At 1234, explicit instructions can be provided. For example, the instructor may operate a "show me hands" or "mute hands" capability in the system to hide and/or show different components of a learner (e.g., via an interface component).

In some implementations, new sampling of sensors can be negotiated, at 1236. Further, at 1238, immersive parts can be updated. For example, at 1236, the system may highlight different parts of instructor's immersion (e.g. fingers, face, and so on) to demonstrate which is the more critical area. In this manner, the system can provide cues for learners to switch (if not enabled to do so), as indicated at 1240.

The system records signals and proposes reviews at 1242. According to some implementations, the recording can be timestamped. For example, the system can aggregate (sentiment and avatar representation) with timeline and/or material capture. The system may generate highlights, interim tests and/or review material where detected frustration or specific avatar modality switches were detected. The system can, at 1244, propose replay of virtual environment but with variants on prior renderings (e.g. try with zoom in on hands, try different playback speed, and so on).

Described herein are systems, methods, articles of manufacture, non-transitory machine-readable medium, and other embodiments or implementations that can facilitate avatar modifications for learning and other videotelephony sessions in advanced networks, as discussed herein. For example, provided herein is the enablement of avatar modifications for learning and other videotelephony sessions. The disclosed embodiments can replace one or more videos or portions thereof and/or one or more portions of audio with one or more avatars. The one or more avatars can have varying degrees, which can range from a simpler avatar, such as an emoji, to a more complex avatar, such as the actual representation of a person and the associated emotional state (e.g., smiling, confused, happy, sad, anxious, and so on).

Figure 13:
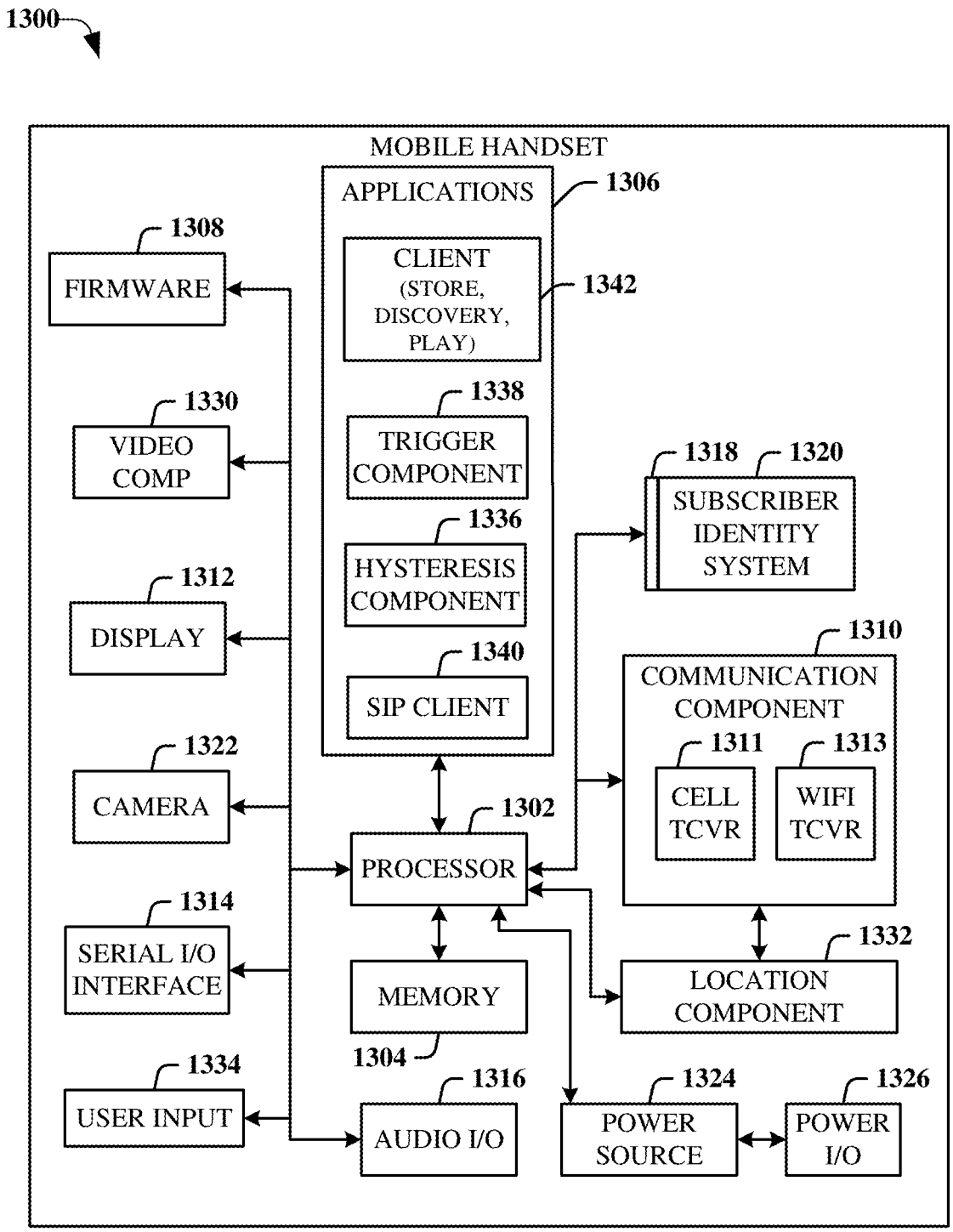
FIG. 13 illustrates an example, non-limiting, block diagram of a handset operable to engage in a system architecture that facilitates wireless communications according to one or more embodiments described herein.

Referring now to FIG. 13, illustrated is an example, non-limiting, block diagram of a handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touchscreen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for a dual-mode GSM handset. The handset 1300 can accommodate at least satellite radio services through a handset that can combine wireless voice and digital radio chipsets into a single handheld device.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 14:
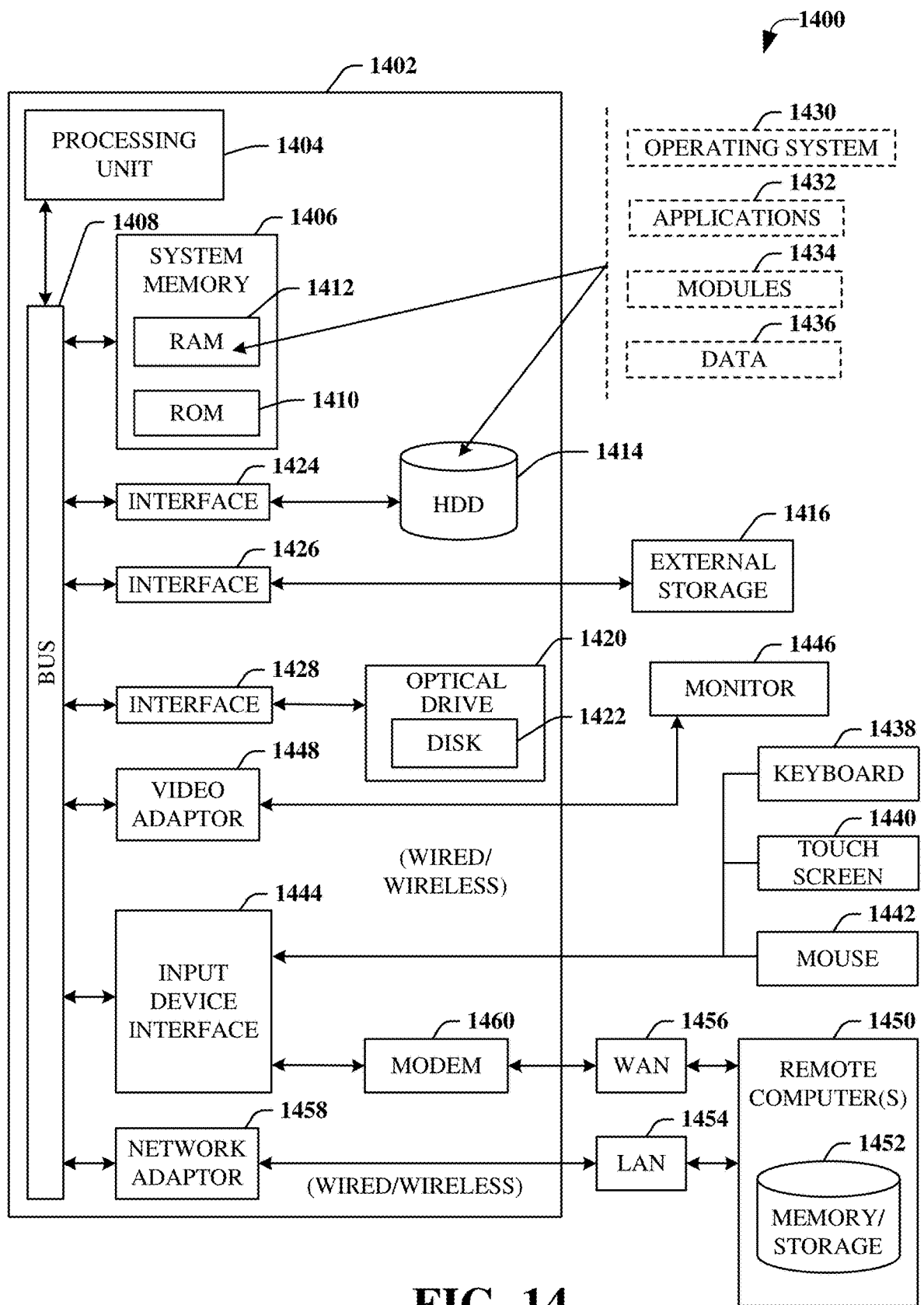
FIG. 14 illustrates an example, non-limiting, block diagram of a computer operable to engage in a system architecture that facilitates wireless communications according to one or more embodiments described herein.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A Basic Input/Output System (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and a drive 1420, e.g., such as a solid state drive, an optical disk drive, which can read or write from a disk 1422, such as a CD-ROM disc, a DVD, a BD, etc. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally include emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can include one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For example, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   evaluating, by a system comprising a processor, an interaction of a first entity during consumption of first streaming content of a video conference by the first entity, resulting in an evaluated interaction, wherein the first entity and a second entity are participating in the video conference;
   based on the evaluated interaction, replacing, by the system, a first portion of a human likeness of the first entity in the evaluated interaction with information indicative of an avatar representation of the first entity while maintaining a second portion of the human likeness of the first entity in the evaluated interaction, resulting in second streaming content;
   determining a learning mode associated with the video conference; and
   changing a feature of another avatar representation of the second entity based on the learning mode.

2. The method of claim 1, wherein the avatar representation is a first avatar representation, wherein the first streaming content is able to be represented according to a first modality and a second modality, and wherein the replacing comprises:
   using the first avatar representation based on the first streaming content being able to be represented according to the first modality; and
   using a second avatar representation based on the first streaming content being able to be represented according to the second modality.

3. The method of claim 2, wherein the first modality is related to audio content, and wherein the second modality is related to visual content.

4. The method of claim 2, wherein the using of the first avatar representation comprises selecting the first avatar representation from a first group of avatar representations mapped to the first modality, and wherein the using of the second avatar representation comprises selecting the second avatar representation from a second group of avatar representations that is mapped to the second modality.

5. The method of claim 1, wherein the method further comprises:
   facilitating, by the system, a transmission of the second streaming content to the second entity.

6. The method of claim 1, wherein the replacing comprises masking an identity of the first entity.

7. The method of claim 1, wherein the replacing comprises mitigating an amount of bandwidth consumed during transmission and consumption of the second streaming content as compared to a video recording of the first entity.

8. The method of claim 1, wherein the first streaming content and the second streaming content are respective portions of the video conference.

9. The method of claim 1, wherein the replacing comprises:
   inferring a state of the first entity based on employing natural language processing.

10. A system, comprising:
    a processor; and
    a memory that stores executable instructions that, when executed by the processor, facilitate performance of operations, the operations comprising:
       evaluating a recorded interaction associated with a first entity during consumption of a first portion of a video conference determined to include the first entity, wherein the first entity and a second entity are participating in the video conference;
       transforming a first portion of an actual representation of the first entity in the recorded interaction to an avatar representation while maintaining a second portion of the actual representation of the first entity in the recorded interaction, resulting in an edited interaction of the first entity;

outputting the edited interaction of the first entity for consumption of a second portion of the video conference by rendering the edited interaction for the second entity;

determining a learning mode associated with the video conference; and changing a feature of another avatar representation of the second entity based on the learning mode.

11. The system of claim 10, wherein the recorded interaction is a first recorded interaction, wherein the avatar representation is a first avatar representation, wherein the edited interaction is a first edited interaction, and wherein the operations further comprise:

evaluating a second recorded interaction associated with the first entity during consumption of a third portion of the video conference determined to include the first entity; and changing from the first avatar representation to a second avatar representation based on the evaluating of the second recorded interaction, resulting in a second edited interaction of the first entity.

12. The system of claim 11, wherein the operations further comprise:

outputting the second edited interaction of the first entity for consumption of a fourth portion of the video conference by rendering the second edited interaction for the second entity.

13. The system of claim 10, wherein the operations further comprise:

concealing, via the avatar representation, an identity of the first entity from the second entity while rendering the edited interaction for the second entity.

14. The system of claim 10, wherein the operations further comprise:

determining that a first language spoken by the first entity and a second language spoken by the second entity are different languages; and converting the first language into the second language for consumption by the second entity, resulting in a converted audio content, wherein the edited interaction comprises the converted audio content.

15. The system of claim 10, wherein the operations further comprise:

augmenting voice content of the first entity, wherein the augmenting comprises masking an identity of the first entity while rendering the edited interaction for the second entity.

16. The system of claim 10, wherein the transforming comprises conveying an emotional state of the first entity based on a selection of the avatar representation.

17. The system of claim 10, wherein the avatar representation is a first avatar representation, and wherein the operations further comprise:

determining that a context of the video conference has changed from a first context to a second context, wherein the first context is based on visual information, and wherein the second context is based on audible information; and modifying an ongoing edited interaction based on changing the first avatar representation associated with the first context to a second avatar representation associated with the second context.

18. A non-transitory machine-readable medium, comprising executable instructions that, when executed by a processor, facilitate performance of operations, the operations comprising:

monitoring first facial expressions of a first user and second facial expressions of a second user, wherein the first user and the second user are engaged in an interactive videotelephony session via network equipment that is part of a communication network, wherein a first user equipment is associated with the first user and a second user equipment is associated with the second user;

based on the first facial expressions of the first user, transforming a first portion of a first visual representation of the first user into a first avatar representation while maintaining a second portion of the first visual representation of the first entity;

based on the second facial expressions of the second user, transforming a second visual representation of the second user into a second avatar representation, wherein the first avatar representation and the second avatar representation are respectively rendered via the first user equipment of the first user and the second user equipment of the second user;

determining a learning mode associated with the interactive videotelephony session; and changing a feature of the second avatar representation based on the learning mode.

19. The non-transitory machine-readable medium of claim 18, wherein the operations further comprise:

facilitating a first rendering of the first avatar representation on a first display of the second user equipment; and facilitating a second rendering of the second avatar representation on a second display of the first user equipment.

* * * * *